(12) United States Patent
Panje et al.

(10) Patent No.: US 11,290,953 B2
(45) Date of Patent: Mar. 29, 2022

(54) UTILIZING BSS TRANSITION MANAGEMENT (BTM) STEERING PRIMER MESSAGES TO DETERMINE WHETHER WIRELESS DEVICES SUPPORT BTM STEERING

(71) Applicant: ARRIS Enterprises LLC, Suwanee, GA (US)

(72) Inventors: Krishna Prasad Panje, Bangalore (IN); Anil Kumar Nellore, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/506,928

(22) Filed: Jul. 9, 2019

(65) Prior Publication Data

US 2020/0260373 A1    Aug. 13, 2020

Related U.S. Application Data

(60) Provisional application No. 62/805,294, filed on Feb. 13, 2019.

(51) Int. Cl.
*H04W 48/20*    (2009.01)
*H04W 8/24*    (2009.01)
*H04W 4/80*    (2018.01)
*H04W 84/12*    (2009.01)

(52) U.S. Cl.
CPC .............. *H04W 48/20* (2013.01); *H04W 8/24* (2013.01); *H04W 4/80* (2018.02); *H04W 84/12* (2013.01)

(58) Field of Classification Search
CPC ......... H04W 4/80; H04W 48/20; H04W 8/24; H04W 84/12; H04W 28/08; H04W 36/22; H04W 48/06
See application file for complete search history.

(56) References Cited

U.S. PATENT DOCUMENTS

| | | |
|---|---|---|
| 7,400,901 B2 | 7/2008 | Kostic et al. |
| 8,315,626 B2 | 11/2012 | Huotari et al. |
| 10,499,282 B1 * | 12/2019 | Kamath ................. H04W 28/08 |
| 2015/0111575 A1 | 4/2015 | Lei et al. |
| 2016/0073294 A1 | 3/2016 | Wijting et al. |
| 2016/0262163 A1 * | 9/2016 | Gonzalez Garrido ....................... H04W 16/10 |

* cited by examiner

*Primary Examiner* — Zhensheng Zhang
(74) *Attorney, Agent, or Firm* — Wenderoth, Lind & Ponack, L.L.P.

(57) ABSTRACT

Wireless devices connect to different access points (AP) in a wireless network. The wireless network may determine that based on, for example, congestion of certain APs that a wireless device should be steered away from a current AP. The steering may be conducted utilizing blacklist steering where one or more APs blacklist the wireless device from being connected thereto. Alternatively, BSS transition management (BTM) steering may be utilized to provide the wireless device with a list of one or more network-preferred APs it should transition to. BTM steering is preferable but not all wireless devices support it so blacklist steering is utilized unless it is known that the wireless device supports BTM steering. Wireless devices do not always indicate they support BTM steering in same manner. BTM steering primer messages are utilized when a wireless device is in line for steering to determine whether BTM steering is supported.

18 Claims, 6 Drawing Sheets

UTILIZING BSS TRANSITION MANAGEMENT (BTM) STEERING PRIMER MESSAGES TO DETERMINE WHETHER WIRELESS DEVICES SUPPORT BTM STEERING

PRIORITY

This application claims the priority under 35 USC § 119 of Provisional Application 62/805,294 filed on Feb. 13, 2019, titled "Wi-Fi Home Network Controller Improvised Client Steering" and having Krishna Prasad Panje and Anil Kumar Nellore as inventors. Application 62/805,294 is herein incorporated by reference in its entirety.

BACKGROUND

More and more devices are capable of communicating wirelessly and the functionality available on wireless devices continues to increase. Wireless communications may be between wireless devices and/or with the Internet. The wireless communications between wireless devices may be accomplished using one or more wireless protocols. For example, wireless devices may communicate directly with one another using Bluetooth (IEEE 802.15.1). Alternatively, wireless devices may communicate with each other or with the Internet via a wireless local area network, such as Wi-Fi (IEEE 802.11). To communicate via a Wi-Fi network, the Wi-Fi devices may directly connect to the Wi-Fi network via an access point (e.g., router). Bluetooth devices may connect to the Wi-Fi network utilizing a Bluetooth-Wi-Fi bridge.

The wireless devices may be capable of connecting to the Internet and accessing various networks, systems and/or content either via the Internet or a direct connection (e.g., secure link). The wireless devices may connect to the Internet either via a mobile network or via a local area network providing wireless communications, often referred to as a wireless network or a Wi-Fi network. The Wi-Fi network is typically connected to a broadband network and the broadband network connects to the Internet and may be capable of providing a secure link to other networks, systems and/or content.

FIG. 1 illustrates an example system diagram 100 showing wireless devices 160 connecting to the Internet 120 as well as, for example, networks, systems, webpages and/or content providers (simply referred to as content providers for ease of discussion) 110 that are also connected to the Internet 120. The wireless devices 160 may connect to the Internet 120 and access content from the content providers 110 via a mobile network 130, such as a cellular network provided by any of the cellular carriers. The wireless devices 160 may also connect to the Internet 120 and access content from the content providers 110 via a broadband delivery network (wide area network) 140. The delivery network 140 may be, for example, a cable network, a telephony network, or a satellite network. The wireless devices 160 may connect to the delivery network 140 via a wireless local area network 150, such as a Wi-Fi network, that is connected to the delivery network 140. Non-wireless devices (e.g., desk top computers) may also connect to the Wi-Fi network 150.

The wireless devices (Bluetooth and/or Wi-Fi) include devices that typically remain in same location (stationary devices) and devices that are typically changing locations with a user (mobile devices). The stationary devices may include, but are not limited to, televisions, appliances, entertainment systems, door locks, and security cameras. The mobile devices may include, but are not limited to, computers, tablets, phones, watches (e.g., Apple® watch), activity trackers (e.g., Fitbit®), electronic-readers (e.g., Kindle®), remote controls, headphones, toys and remote starters.

With the increase in the number and type of wireless devices that are in use every day comes a need for an increase in performance (e.g., speed, bandwidth, range) of wireless (e.g., Wi-Fi) networks. Increased speed may be necessary to handle the increasing capabilities of many of these devices, such as ultra-high definition video. Increased bandwidth may be required to handle the increased number of devices that are likely accessing the Wi-Fi network. Increased range is required as the wireless devices are likely located at varying distances from an access point for the Wi-Fi network so the Wi-Fi network needs to be able to communicate further distances.

Higher speed Wi-Fi networks such as those operating at 5 GHz (5G networks) have been deployed. However, many Wi-Fi devices are still designed for lower speed networks such as those operating at 2.4 GHz (2.4G networks). Accordingly, it is often the case where Wi-Fi networks are designed to operate at multiple frequencies (e.g., 2.4G and 5G). A Wi-Fi network may include a modem to connect to a broadband network (e.g., cable network, telco network, satellite network) provided by a service provider and a Wi-Fi router to provide a Wi-Fi access point to the broadband network. The Wi-Fi router may include multiple antennas (e.g., 2.4G and 5G) so they can operate at multiple frequencies. The modem and Wi-Fi router may be combined in a single device (e.g., gateway).

Furthermore, the Wi-Fi network may utilize access points (e.g., extenders, routers, bridges, repeaters) in order to expand the bandwidth and range of the Wi-Fi networks to areas that may not be capable of receiving a Wi-Fi signal from the gateway (main access point). The access points may provide the ability to connect to one or more of the Wi-Fi networks (e.g., 2.4G, 5G) provided by the gateway by transmitting the Wi-Fi signal from the location of the network extender. The access points may communicate with the gateway via a wired (e.g., home electrical wiring, coaxial cable, Ethernet cable) connection or a Wi-Fi connection.

FIG. 2 illustrates an example high level system diagram of a Wi-Fi network 150. The Wi-Fi network 150 may include a modem 210, a Wi-Fi router 220 and one or more access points (e.g., extenders) 230. The modem 210 is for communicating with a broadband network 140. The Wi-Fi router 220 is connected to the modem 210 to provide a link between the Wi-Fi network 150 and the broadband network 140. The Wi-Fi router 120 may include one or more antennas to transmit and receive Wi-Fi signals to enable communications with wireless devices 150.

The location of the router 220 should be in close proximity to the modem 210. According to one embodiment, the modem 210 and the router 220 may be combined into a single component (e.g., gateway) 200. The modem 110 and the router 120 may be located in a central part of the location and/or an area where most wireless traffic is expected. For example, the modem 210 and the router 220 may be located on the main floor in a residence or may be located in a home office.

As the Wi-Fi router 220 may not be capable of communicating with wireless devices that are too far away, the access points 230 may be located at points remote from the Wi-Fi router 220 to provide for additional Wi-Fi communications with additional wireless devices. The access points 230 may be located at locations where, for example, the Wi-Fi signal from the router 220 may not be strong enough to provide high-quality service, or where relatively high Wi-Fi traffic is expected, or at other locations where a quality Wi-Fi signal is desired/required. For example, an access point 230 may be located on different floors from the router 220 or in a home office or an entertainment room where connectivity is important. The access points 230 may provide a subset or all of the frequency bands of the Wi-Fi router 220.

The wireless devices connected to the router 220 or the access points 230 may be stationary devices 240 or may be mobile devices 250. The wireless devices 240, 250 may be connected to the access point (e.g., router 220, extender 230) that has the strongest signal strength. As illustrated, the router 220 is connected to two stationary wireless devices 240 and one mobile wireless device 250, a first access point 230 (access point 1) is connected to two mobile wireless devices 250, and a second access point 230 (access point 2) is connected to one stationary wireless device 240 and one mobile wireless device 250. The configuration of the wireless network 150 is not limited to any specific location for the router 220, any number or location of the access points 230, any number of wireless devices 240, 250 being connected to the Wi-Fi network 150 or any wireless device connection topology. In fact, the number and access point connectivity configuration of the wireless devices 240, 250 may vary over time as the mobile wireless devices 250 move within the location.

In addition, devices that do not support wireless communications (e.g., desktop computer) or devices that support both wired and wireless communications (e.g., entertainment system, printer) may connect to the Wi-Fi network 150 via a wired connection. The wired connection may be to an access point that supports both wired and wireless communications (e.g., router 220) or to an access point that simply supports wired communications.

The Wi-Fi network 150 may be configured in such a fashion that the router 220 and the access points 230 have the same service set identifier (SSID) and password so that once a wireless device 240, 250 connects to the network 150 via any access point, it can be connected the network 150 via any other access point without having to select another SSID or enter another password. Each access point within the Wi-Fi network 150 may have a unique basic service set identifier (BSSID) that is utilized by the network 150 to track activity associated with the access point (which may be referred to as a BSS). The BSSID for an access point (BSS) may, for example, be the media access control (MAC) address of the access point. If the access point has two radios (supports two frequency bands), the access point may have two BSSIDs (one for each frequency). The BSSIDs for the different radios may be based on the MAC address for the access point.

SUMMARY

A method for determining whether a wireless device supports BSS transition management (BTM) steering. The method includes determining when steering of the wireless device is required. A BTM steering primer message is sent to the wireless device and the wireless device is monitored for indications that the wireless device supports BTM steering.

A device for determining whether a wireless device supports BSS transition management (BTM) steering. The device comprises a wired interface to communicate with one or more wireless access points associated with a wireless network; a processor communicatively coupled to a memory for storing network configuration information, network connectivity information, and a BTM steering-capable list for identifying wireless devices that support BTM steering; and a computer-readable storage medium to store instructions. When the instructions are executed by the processor they cause the processor to: determine when steering of the wireless device is required; instruct a current wireless access point to prepare and send a BTM steering primer message to the wireless device; and monitor the wireless device for an indication that the wireless device supports BTM steering.

A wireless network comprising: a plurality of wireless access points to enable wireless devices to connect thereto; and a network controller for controlling operation of the wireless network. To generate a determination of whether a wireless device connecting to the wireless network supports BSS transition management (BTM) steering, the network controller is configured to: determine when steering of the wireless device is required; instruct a current access point to prepare and send a BTM steering primer message to the wireless device; and monitor the wireless device for an indication that the wireless device supports BTM steering.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

The network 150 may include a network controller that establishes the configuration of the network and tracks parameters associated therewith. The network controller may, for example, be a wireless network controller for a multiple access point network or "mesh" network, such as a Wi-Fi certified EasyMesh™ network controller. Conventional Wi-Fi certified EasyMesh™ network technology provides mesh networks that are easy to install and use, self-adapting, and that feature multi-vendor interoperability. Examples of the multiple access point network include home and small office Wi-Fi networks with a network controller to manage the network, which consists of the controller plus additional access points (APs). One or more controllers that manage and coordinate activity among the APs ensure that each AP does not interfere with the other.

Figure 1:
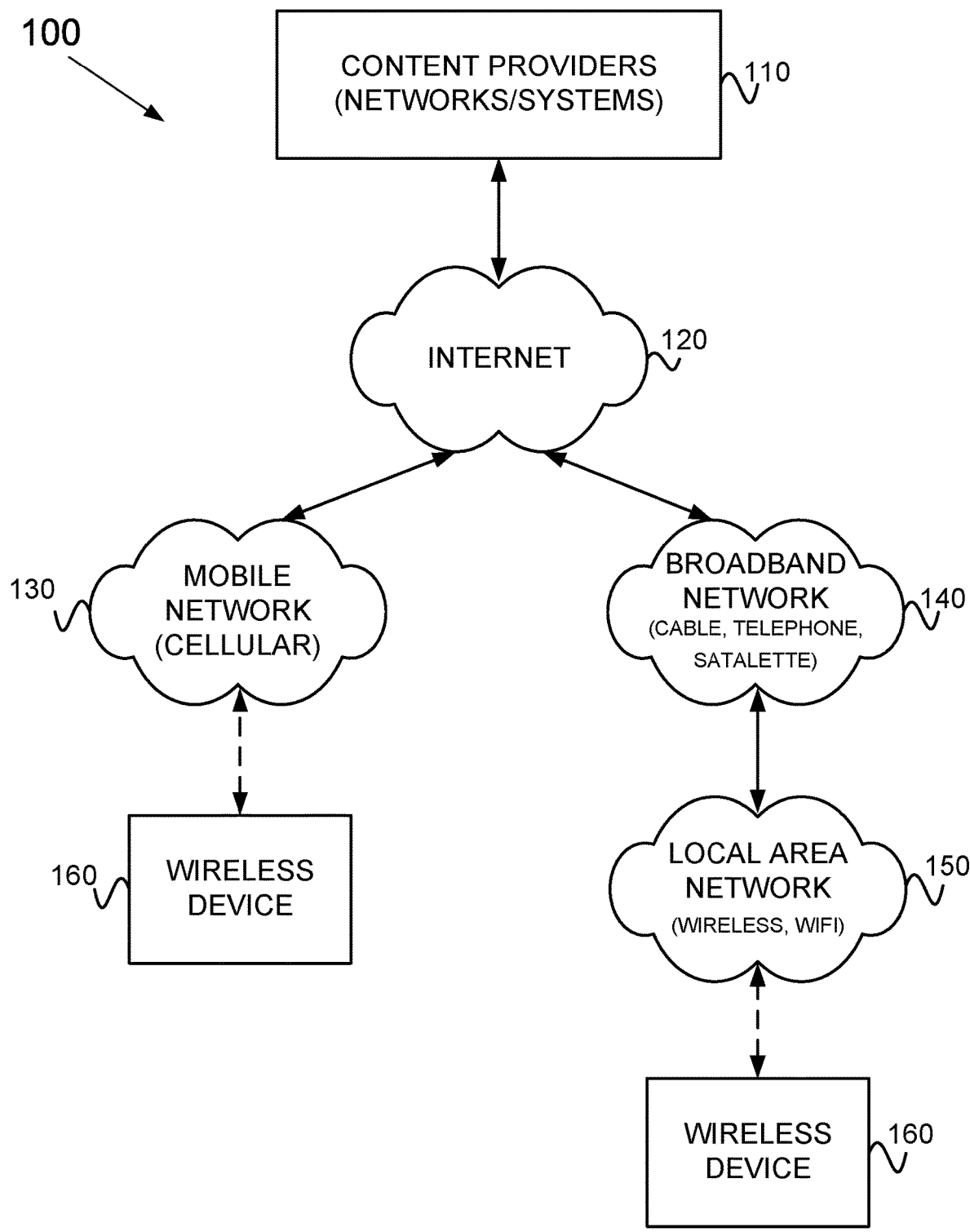
FIG. 1 illustrates an example system diagram showing wireless devices connecting to the Internet as well as networks, systems and/or content providers connected thereto.
Figure 2:
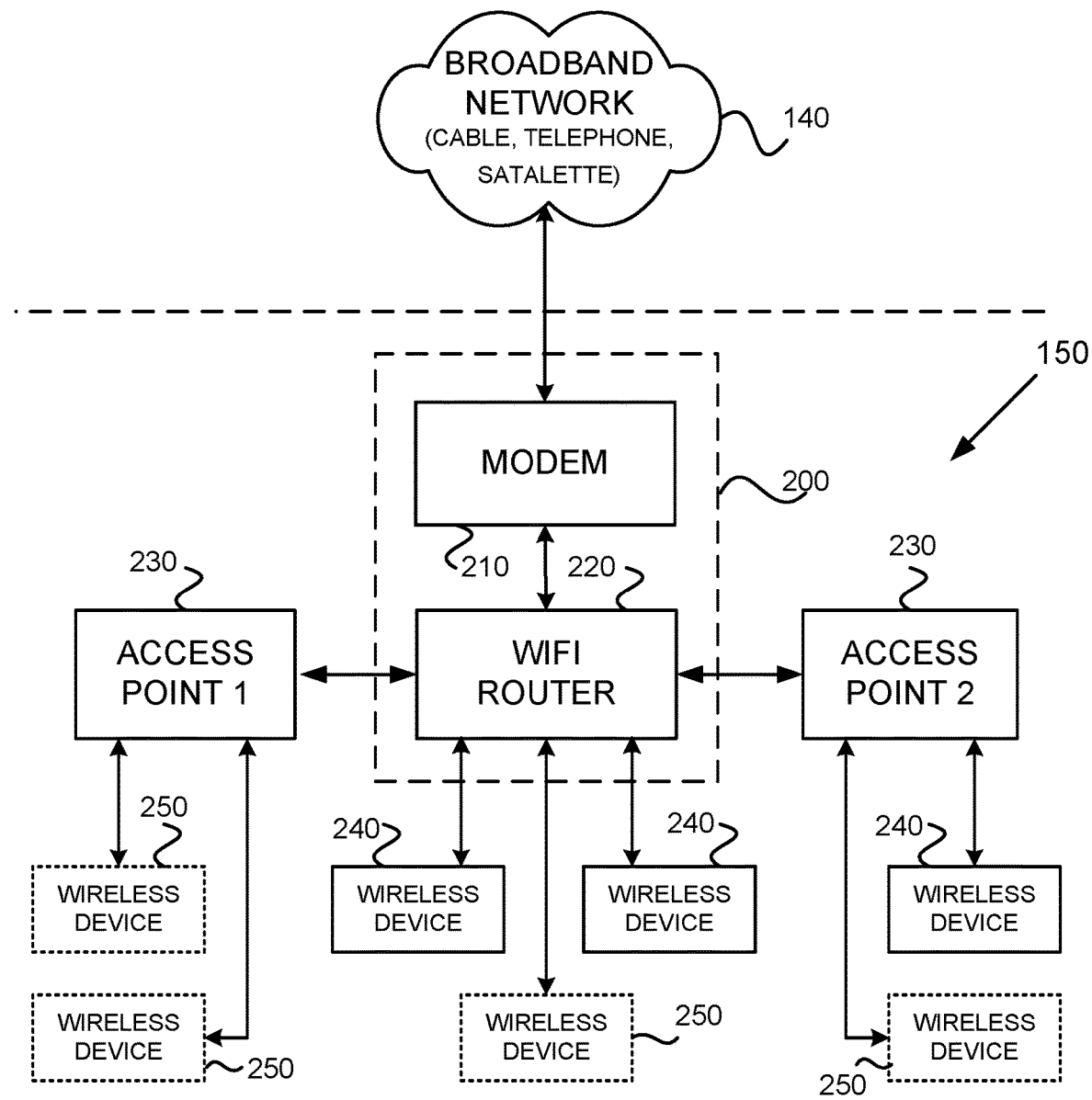
FIG. 2 illustrates an example high level system diagram of a Wi-Fi network within a location.

Referring to FIG. 2, the network controller may track connectivity of the wireless devices 240, 250 to each of the access points 200, 230 in the network 150 and the bandwidth being utilized by the wireless devices 240, 250 connected thereto. The network controller may be capable of determining whether certain access points 200, 230 or frequency bands are getting congested based on the number of wireless devices 240, 250 connected thereto and the activities being performed thereon and may act to steer the traffic based thereon. The steering may be selected, for example, to maintain or improve a quality of experience (QoE) for the various wireless devices connected to the network.

The network controller may also track different activities about the network 150 and the devices 240, 250 connected thereto and may process those activities to define trends thereabout. The network controller may utilize the trends to predict activities and make proactive steering decisions based thereon. The network controller may be, for example, established in an access point.

The network controller may implement the steering of wireless devices in one of two typical methods. A first method entails the network controller blacklisting the wireless device on one or more APs that the network controller determines the wireless device should not connect to, in order to steer the wireless device to a network-preferred AP or one of a few network-preferred APs. This method may cause the wireless device to lose connectivity with the current AP to which it is connected, and to reinitiate a process for connecting to the network and a new AP. This process may not be efficient, as it requires an existing connection between the wireless device and wireless network to be broken and then reestablished.

Figure 3:
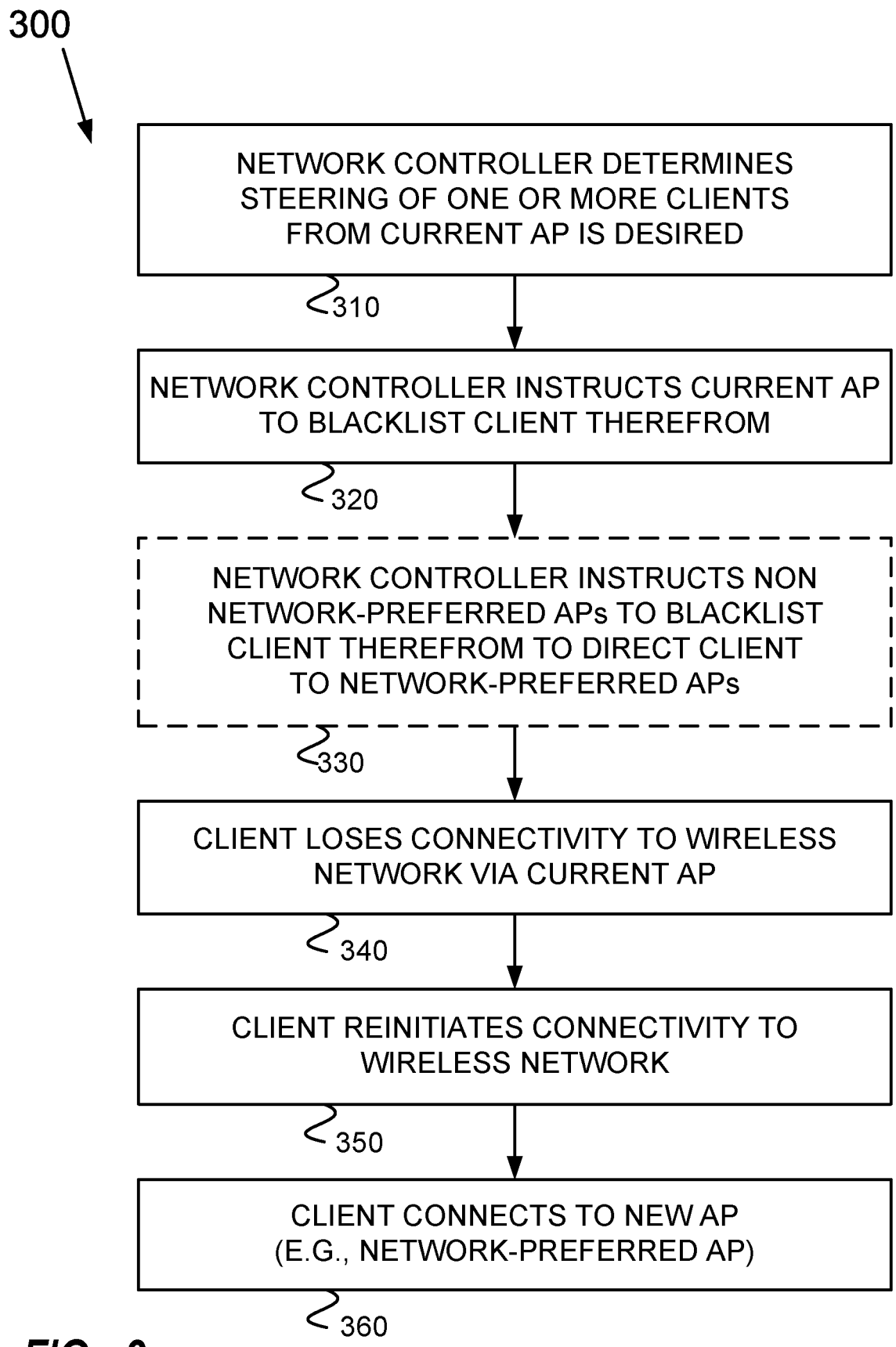
FIG. 3 illustrates an example process flow for blacklist steering that entails utilizing blacklisting of the wireless device from one or more APs to steer a wireless device to a new AP, according to one embodiment.

FIG. 3 illustrates an example process flow 300 for blacklist steering (blacklisting the wireless device for one or more APs to steer the wireless device to a new network-preferred AP). The steering may be simply away from the current AP or may be to a specific network-preferred AP or one of a few network-preferred APs. Initially the network controller determines that one or more wireless devices (clients) should be steered, for transitioning each client away from a current AP to which the client is connected 310. The network controller instructs the current AP to blacklist the client therefrom 320. The blacklisting of the client from the current AP will cause the client to lose connectivity therefrom and will not allow the client to reconnect thereto. If the network controller simply determines that the client should be steered away from the current AP, that may be the only blacklisting that occurs.

However, if the network controller determines that the client should be steered to a specific network-preferred AP or one of a few network-preferred APs, then network controller may blacklist the client from additional APs in order to further control the steering 330. The blacklisting of the client may be done for all APs other than the specific network-preferred AP, or other than the few network-preferred APs. The blacklisting of the client from APs to which it is not currently connected will prevent the client from connecting to those APs. Accordingly, the client will only be able to connect to a specific network-preferred AP or to one of a few network-preferred APs.

The client then loses connectivity to the wireless network via the current AP, based on the blacklisting of the client therefrom 340. The client then reinitiates connectivity to the wireless network 350. The client will not be able to reconnect to the AP from which it was disconnected, because of the blacklisting therefrom (320) and will not be able to connect to any other APs (non network-preferred APs) from which it was blacklisted (330). Accordingly, the connectivity of the client to the wireless network will be restricted based on the blacklisting of the client from one or more APs. The client connects to the wireless network via a new AP 360. The new AP may be any other AP then the current AP (if only blacklisting 320 is performed), or a specific network-preferred AP or one of a few network-preferred APs (based on blacklisting 330).

According to one embodiment, the blacklisting 320, 330 may be effective for a defined amount of time (e.g., a number of seconds or minutes). According to one embodiment, the blacklisting 320, 330 may be effective until the AP is no longer in a state (e.g., congested) that initially caused the client to be steered away from the AP. According to one embodiment, the blacklisting 320, 330 may be effective until removed by the network controller.

The method 300 is in no way intended to be limited to the illustrated processes. Rather, additional processes can be added, processes can be combined, processes can be deleted, processes can be modified and/or the order of the processes can be modified without departing from the current scope. The method 300, or portions thereof, may be performed by a processor executing instructions stored on a computer readable storage medium.

A second method for steering wireless devices includes sending BSS transition management (BTM) frames from a current AP to the wireless device, where the BTM frames define a preferred AP, or provide a list of one or more possible preferred APs, to which the network controller attempts to steer the wireless device. It should be noted that the use of BTM frames is a much cleaner method to perform steering, as it does not require the wireless device to be disconnected from the wireless network and then to reconnect to the network at a different AP from which the wireless device is not blacklisted.

Figure 4:
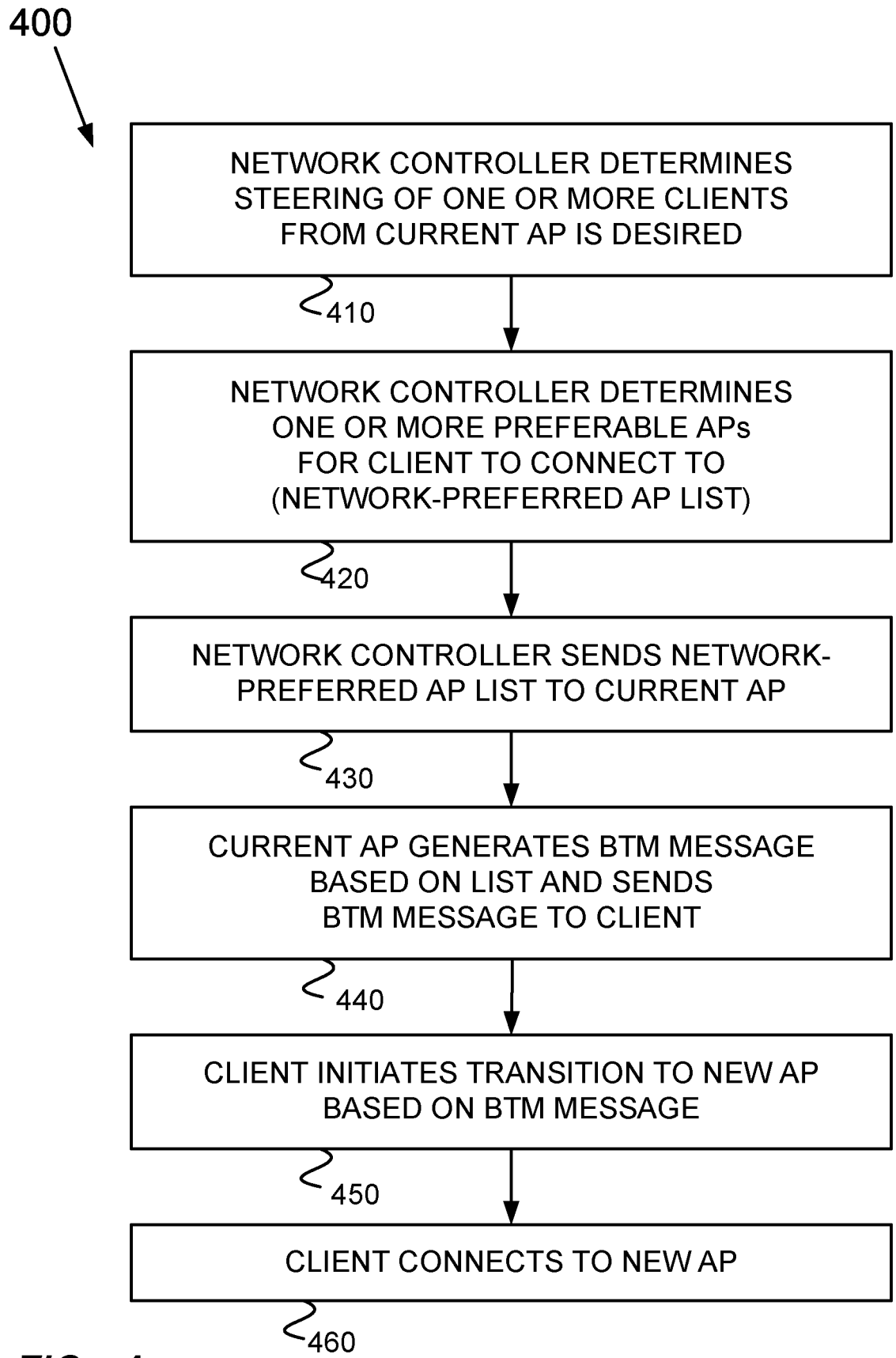
FIG. 4 illustrates an example process flow for BSS transition management (BTM) steering that entails utilizing BTM frames to steer a wireless device to a new AP, according to one embodiment.

FIG. 4 illustrates an example process flow 400 for BTM steering (utilizing BTM frames to steer wireless devices to a new AP). Initially the network controller determines that one or more wireless devices (clients) should be steered, for transitioning each client away from a current AP to which the client is connected 410. The network controller determines one or more preferable APs for the wireless device (client) to connect to the wireless network, and generates a network-preferred AP list 420. The network controller then provides the current AP with the network-preferred AP list 430. The current AP generates a BTM message (BTM steering frames) based on the network-preferred AP list and sends the BTM message to the client 440. The client initiates a transition to a new AP based on the BTM message 450. The client may select which AP it will connect to, by selecting from the one or more APs defined in the BTM message. The client then transitions away from the current AP by connecting to the selected AP 460.

The method 400 is in no way intended to be limited to the illustrated processes. Rather, additional processes can be added, processes can be combined, processes can be deleted, processes can be modified and/or the order of the processes can be modified without departing from the current scope. The method 400, or portions thereof, may be performed by a processor executing instructions stored on a computer readable storage medium.

BTM steering is not supported by all wireless devices (clients). Accordingly, the BTM messages are only sent to wireless devices that are known to support BTM steering. All other wireless devices may be steered via blacklist steering. The wireless devices may indicate that they support BTM steering, e.g., in association/reassociation requests from the wireless device to the network. The indication of whether BTM steering is supported may be found in, for example, an extended capabilities field in the association/reassociation requests.

When an association request is received from a client, the AP may parse the message to determine whether the appropriate field identifies that the client supports BTM steering. If the request indicates BTM steering is supported by the client, the client is added to, for example, a BTM steering-capable list that is maintained for the network. The BTM steering-capable list may be maintained by the network controller. When the network controller determines that a client needs to be steered to a new AP, the network controller checks the list to determine whether the steering can be done via BTM steering. If the client is on the list, steering may be handled with BTM steering. If the client is not on the list, steering may need to be done by blacklist steering.

The APs may, in some cases, only parse the association request (and not a reassociation request) to determine whether BTM steering is supported, as there presumably may be no reason to parse a reassociation request in cases where the support for the feature would have previously been indicated in an association message and that indication would have been detected. Furthermore, it may be impractical to check all the reassociation requests, as multiple reassociation requests may be processed while the client is connected to the network. However, not all clients that support BTM steering will indicate this support in the association request. Some clients will only include the indication in reassociation requests, and some clients will not provide any such indication at all.

If the network controller does not know that the client supports BTM steering, the network controller will not add the client to the BTM steering-capable list and will not utilize BTM steering to steer the client to a new AP, but instead will use blacklist steering. As noted above, BTM steering is preferred as it may be done quicker and does not require the client to lose connectivity with the network temporarily (as blacklist steering does). Accordingly, a failure to determine that a wireless device supports BTM steering, when in fact it does support BTM steering, can require excess time and resources and can require a temporary disconnection of the wireless connection as a result of using the non-preferred blacklist steering.

What is needed is a way to determine whether a client supports BTM steering, regardless of the type of indication given by the client, and/or regardless of whether any indication is given at all.

Figure 5:
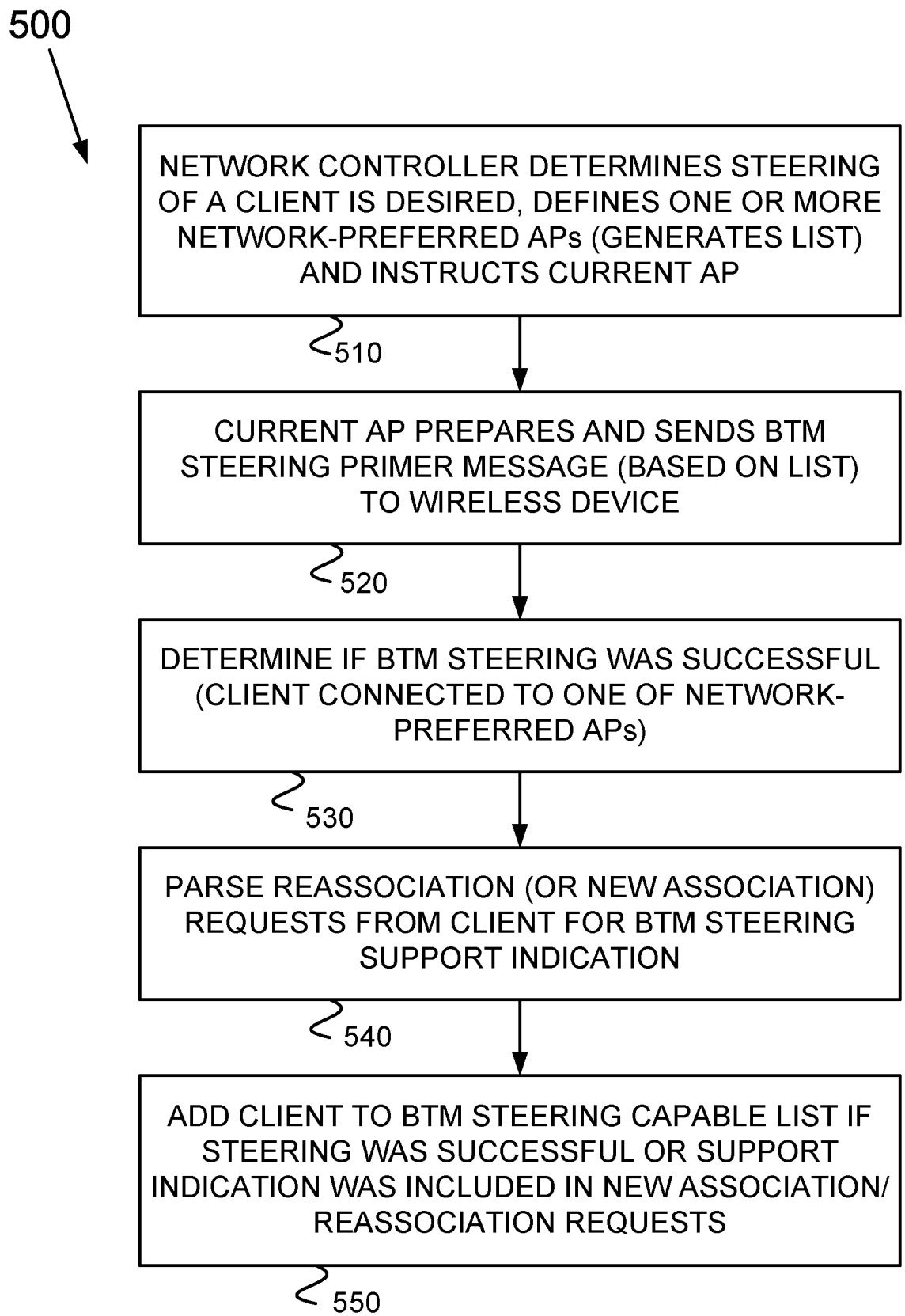
FIG. 5 illustrates an example process flow for determining whether a wireless device supports BTM steering, according to one embodiment.

FIG. 5 illustrates an example process flow 500 for determining whether a wireless device (client) supports BTM steering. Initially, the network controller determines that steering of a client is required (or is imminent) 510. The determination that steering is required may be a first steering event for the client, but is not limited thereto. Rather, the determination of steering being required may be for any steering event, so long as it was not previously determined that BTM steering was not supported for the client. The steering event may be, for example, during installation, during network acclimatization, or when the client first enters into a connection with the network.

Regardless of the client capability, the network controller may determine one or more network-preferred APs (generate a network-preferred AP list) and may direct a current AP to generate a BTM steering message based thereon 510. The current AP may prepare the BTM steering message based on the network-preferred AP list provided by the network controller and may send the BTM steering message to the client 520. As the network controller does not know whether the client supports BTM steering at this point, this message may be considered a BTM steering primer message (i.e., a message that primes the system for improved steering of the client). Just like the BTM steering message defined above with respect to FIG. 4, the BTM steering primer message may identify a single network-preferred AP or a list of network-preferred APs. After the BTM steering primer message is sent, the client to AP connections are monitored to determine whether the BTM steering was successful and the client is connected to one of the network-preferred APs identified in the BTM steering primer message 530.

After the BTM steering message is sent, the APs may parse any reassociation requests (or new association requests) that are received from the client to determine whether the new request includes an indication that BTM steering is supported 540. If the client was successfully steered to one of the network-preferred APs or a new request includes the appropriate indication, the client is added to the BTM steering-capable list 550 and future steering requests to the client will be BTM steering requests.

The method 500 is in no way intended to be limited to the illustrated processes. Rather, additional processes can be added, processes can be combined, processes can be deleted, processes can be modified and/or the order of the processes can be modified without departing from the current scope. The method 500, or portions thereof, may be performed by a processor executing instructions stored on a computer readable storage medium.

According to one embodiment, the method 500 may include some manner of identifying clients that were sent BTM steering primer messages that did not result in the client being added to the BTM steering-capable list. That is, if the client was not added to the list based on the primer message, the client presumably does not support BTM steering. As such, there would be no reason to continue to send BTM steering primer messages to the client. Without some manner of identifying the clients that presumably do not support BTM steering (BTM steering primer message did not result in a determination that BTM steering was supported), it is possible that the primer messages will continue to be sent to these clients.

According to one embodiment, the network controller may maintain a list of clients that had a BTM steering primer message sent thereto. If the client is on this list and not on the BTM steering-capable list the client will not be sent primer messages. According to one embodiment, a do not support BTM steering list may be maintained where clients are only added to this list if the primer message is sent and the client was not added to the BTM steering-capable list. According to one embodiment, the BTM steering-capable list may include clients that support BTM steering and clients that do not support BTM steering. The clients are added to the list as supporting BTM steering when the indication is detected in an association and/or reassociation request or the client responds to the BTM steering primer message (is steered to new AP based on primer). The clients are added to the list as not supporting BTM steering when no indication is included in either an association and/or reassociation request and the client does not respond to the BTM steering primer message (is not steered to new AP based on BTM steering primer).

Figure 6:
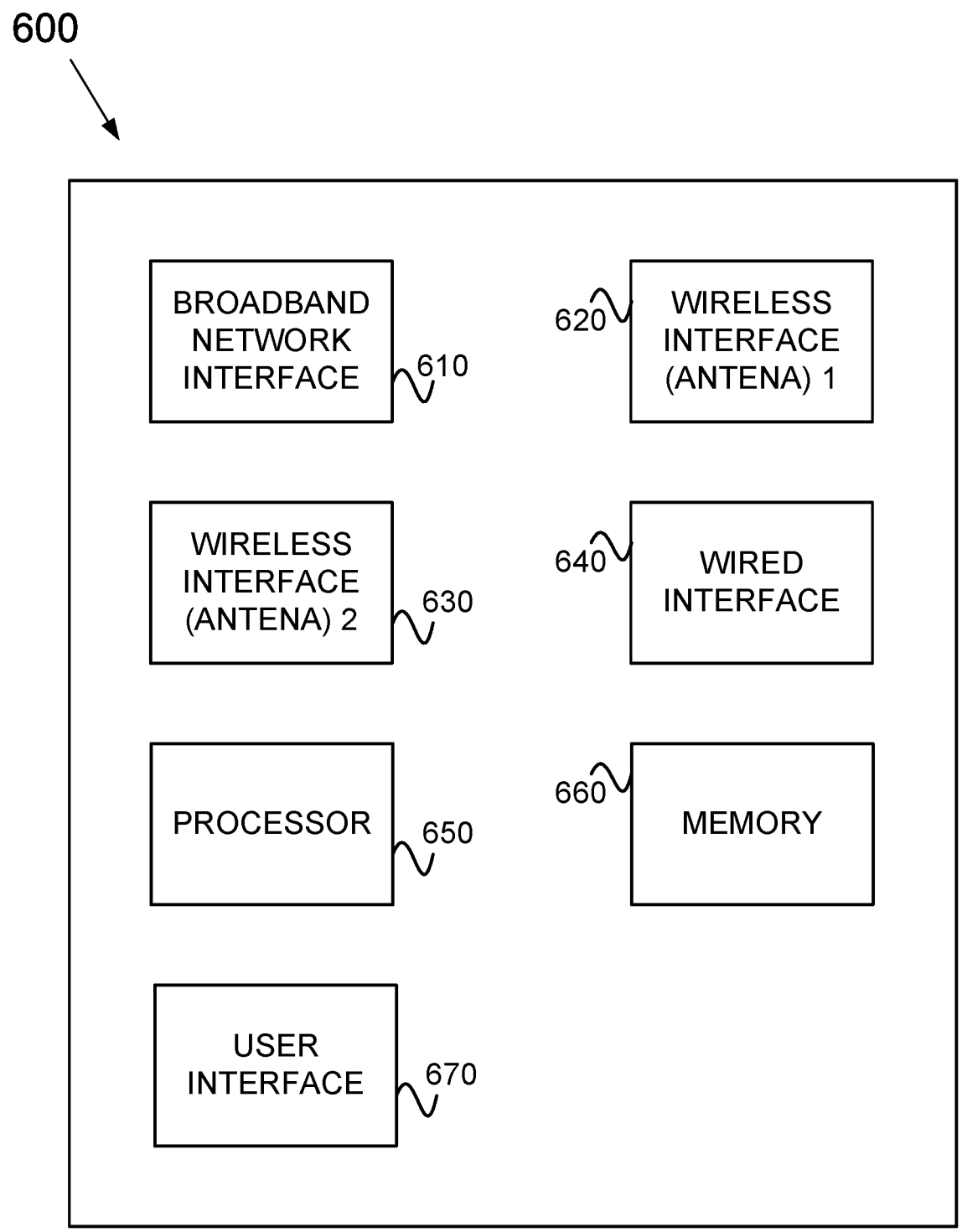
FIG. 6 illustrates an example high level functional diagram of a main access point (gateway) capable of acting as a network controller for the Wi-Fi network, according to one embodiment.

FIG. 6 illustrates an example high level functional diagram of an access point (e.g., main access point, gateway) 600 capable of acting as a network controller for the Wi-Fi network. The gateway 600 may include a broadband network interface 610, a first Wi-Fi interface (antenna) 620, a second Wi-Fi interface (antenna) 630, a wired interface 640, a processor 650, memory 660 and a user interface 670. Other access points (e.g., network extenders) may have similar functional diagrams, but would not need the broadband network interface 610. In addition, other access points may not include the wired interface 640 and may not include multiple Wi-Fi interfaces but rather may be limited to operating at a single Wi-Fi frequency.

The broadband network interface 610 is to provide connectivity to and communications with a broadband network 140. The network interface 610 may include a connector, for example, a coaxial connector for receiving a coaxial cable and associated protocols for providing the necessary communications with the broadband network 140 (e.g., receiving data from and transmitting data to). The broadband network 140 provides access to external content and external system including the Internet.

The first and second Wi-Fi interfaces (antennas) 620, 630 are to provide Wi-Fi communications between the gateway 600 and wireless devices (establish Wi-Fi networks). The first Wi-Fi interface 620 may be to establish a Wi-Fi network operating at a first frequency (e.g., 5 GHz network pursuant to IEEE 802.11a) and the second Wi-Fi interface 630 may be to establish a Wi-Fi network operating at a second frequency (e.g., 2.4 GHz network pursuant to IEEE 802.11b,g). According to one embodiment, it is possible that a single chip includes multiple antennas and can provide communications at different frequencies (e.g., 2.4 and 5 GHz network pursuant to IEEE 802.11n). The wireless devices may utilize the gateway 600 to communicate with other wireless devices within the location or may use it as an access point to connect to the Internet via the broadband network 140.

The wired interface 640 is to provide wired communications between the gateway 600 and other devices. The other devices may be computing devices using the gateway 600 to communicate with wireless devices within the location or access the Internet via the broadband network 140. The other devices may be other access points (e.g., network extenders) that extend the range of the wireless network within the location. The wired interface 640 may include a connector (e.g., coaxial, Ethernet, USB) to receive an appropriate cable and associated protocols for receiving and transmitting data thereover.

The processor 650 is to control the operation of the gateway 600. The processor 650 is to execute computer-executable instructions (e.g., software, apps). The computer executable instructions, when executed, may cause the processor 650 to control the operations of the gateway 600 and perform various functions including, but not limited to, network configuration, network and device parameter definition (e.g., capability of access points, priority devices, priority services), activity monitoring and analysis (e.g., statistics, analytics) and device and network trend generation. Some of the functions performed by the processor 650 are based on data that is collected about the network and the devices connected thereto.

In addition to controlling the operation of the gateway 600, the processor 650 may also control the operation of the network (act as a network controller). As noted earlier, the network controller may be a Wi-Fi certified EasyMesh™ network controller. That is, the processor 650 when executing the computer executable instructions related to the network controller may direct the activities of the other access points in the network including connectivity of wireless devices thereto. The processor 650 when executing the instructions may perform appropriate portions of the operations 300-500.

The memory 660 is to store the computer-executable instructions and/or other data. The other data may include, for example, configuration data (e.g., wireless network topology), connectivity data (e.g., wireless devices actively connected to the wireless network, signal strength of connected devices, congestion of access points), and activity data (e.g., bandwidth utilized by wireless device, tasks being performed). The gateway 600 may receive data related to what is connected to the other access points from the other access points. The data may be received from the access points, for example, when wireless devices connect or disconnect from the access points, when the wireless devices communicate with the broadband network 140 which requires communications with the gateway 600, at defined intervals (e.g., every few seconds) and/or when required for any reason.

The memory 660 may be located on the processor 650 and/or may be separate from the processor 650. The memory 660 storing the computer-executable instructions may be computer-readable memory so that the processor 650 can read and execute the computer-executable instructions.

The memory 660 may be supplemented with external memory that may be located in other access points, in a STB or any other device having storage that is connected to the wireless network and/or in the cloud.

The user interface 670 may include, for example, lights to provide a user an indication about the operational status thereof. The user interface 670 may also include, for example, switches, buttons or the like to enable the user to, for example, power on/off and/or reset the gateway 600.

As described above, the gateway 600 may provide the network controller functionality and have information about the connectivity of wireless devices to different access points in the network, know about the capabilities of the access points and may be capable of predicting future activities of the network. As such, the gateway 600 acting as the network controller is well-suited to determine when steering for a wireless device is advantageous, and which access points are best for connectivity of the wireless device (network-preferred AP list). The network controller may initiate the steering with the appropriate steering commands (e.g., blacklist, BTM) and may determine whether BTM steering is supported even if the wireless devices do not provide any indication thereof.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the preceding embodiments may be implemented using program instructions, an operating system (such as a driver for an interface or device), or in firmware. Alternatively, or additionally, at least some of the operations in the communication technique may be implemented in a physical layer, such as hardware.

In the preceding description, we refer to "some embodiments." Note that "embodiments" or "some embodiments" describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

We claim:

1. A method for determining whether a wireless device supports BSS transition management (BTM) steering, the method comprising:
   determining when steering of the wireless device is required;
   sending a BTM steering primer message to the wireless device;
   monitoring the wireless device for an indication that the wireless device supports BTM steering, which includes after the BTM steering primer message is sent, parsing one of an association request and a reassociation request that is subsequently received from the wireless device to identify capability information included in a data field of the one of the association request and the reassociation request that indicates that the wireless device supports BTM steering;
   adding the wireless device to a BTM steering-capable list if the monitoring indicates that the wireless device supports BTM steering;
   adding the wireless device to a list for blacklist steering if the monitoring does not indicate that the wireless device supports BTM steering; and
   adding the wireless device to the list for blacklist steering if there is no response from the wireless device to the BTM steering primer message.

2. The method of claim 1, further comprising:
   utilizing BTM steering messages for wireless devices included on the BTM steering-capable list for steering the wireless devices.

3. The method of claim 1, further comprising:
   utilizing blacklist steering messages for wireless devices not included on the BTM steering-capable list for steering the wireless devices.

4. The method of claim 1, wherein the BTM steering primer message identifies one or more network-preferred access points to which to steer the wireless device, and monitoring the wireless device further comprises:
   monitoring the wireless device to determine whether the wireless device has been steered to one of the one or more network-preferred access points.

5. The method of claim 4, wherein monitoring the wireless device further comprises:
   adding the wireless device to a BTM steering-capable list if the wireless device connects to one of the one or more network-preferred access points.

6. The method of claim 1, further comprising:
   adding the wireless device to a BTM steering-capable list if the parsing determines that any one of the received requests identifies the wireless device as supporting BTM steering.

7. The method of claim 1, further comprising:
   tracking wireless devices to which BTM steering primer messages were sent.

8. The method of claim 7, further comprising:
   restricting new BTM steering primer messages from being sent to wireless devices to which the BTM steering primer messages were previously sent.

9. A device for determining whether a wireless device supports BSS transition management (BTM) steering, the device comprising:
   a wired interface to communicate with one or more wireless access points associated with a wireless network;
   a processor communicatively coupled to a memory for storing: network configuration information, network connectivity information, and a BTM steering-capable list for identifying wireless devices that support BTM steering; and
   a computer-readable storage medium to store instructions that when executed by the processor cause the processor to:
      determine when steering of the wireless device is required;
      instruct a current wireless access point to prepare and send a BTM steering primer message to the wireless device;
      monitor the wireless device for an indication that the wireless device supports BTM steering which includes, after the BTM steering primer message is sent, to parse a reassociation request subsequently received from the wireless device to identify capability information included in a data field of the reassociation request that indicates that the wireless device supports BTM steering;
      add the wireless device to a BTM steering-capable list if the monitoring indicates that the wireless device supports BTM steering;
      add the wireless device to a list for blacklist steering if the monitoring does not indicate that the wireless device supports BTM steering; and
      add the wireless device to the list for blacklist steering if there is no response from the wireless device to the BTM steering primer message.

10. The device of claim 9, wherein the instructions, when executed, further cause the processor to:
    identify one or more network-preferred access points for which to steer the wireless device;
    instruct the current wireless access point to include the one or more network-preferred access points in the BTM steering primer message;
    monitor the wireless device to determine whether the wireless device has been steered to one of the one or more network-preferred access points; and
    add the wireless device to the BTM steering-capable list if the wireless device connects to one of the one or more network-preferred access points.

11. The device of claim 9, wherein the instructions, when executed, further cause the processor to:
    add an identification of the wireless device to the BTM steering-capable list if the parsing determines that the reassociation request identifies the wireless device as supporting BTM steering.

12. The device of claim 9, wherein the instructions, when executed, further cause the processor to:
    track wireless devices to which BTM steering primer messages were sent; and utilize BTM steering primer messages for wireless devices to which BTM steering primer messages were not previously sent.

13. The device of claim 9, wherein the instructions, when executed, further cause the processor to:
utilize BTM steering messages for the wireless device if it is determined that the wireless device supports BTM steering.

14. A wireless network comprising:
a plurality of wireless access points to enable wireless devices to connect thereto; and
a network controller for controlling operation of the wireless network, wherein to generate a determination of whether a wireless device connecting to the wireless network supports BSS transition management (BTM) steering, the network controller is configured to:
determine when steering of the wireless device is required;
instruct a current access point to prepare and send a BTM steering primer message to the wireless device;
monitor the wireless device for an indication that the wireless device supports BTM steering which includes, after the BTM steering primer message is sent, to parse a reassociation request subsequently received from the wireless device to identify capability information included in a data field of the reassociation request that indicates that the wireless device supports BTM steering;
add the wireless device to a BTM steering-capable list if the monitoring indicates that the wireless device supports BTM steering;
add the wireless device to a list for blacklist steering if the monitoring does not indicate that the wireless device supports BTM steering; and
add the wireless device to the list for blacklist steering if there is no response from the wireless device to the BTM steering primer message.

15. The wireless network of claim 14, wherein to generate the determination, the network controller is further configured to:
identify one or more network-preferred access points for which to steer the wireless device that should be included in the BTM steering primer message;
monitor the wireless device to determine whether the wireless device has been steered to one of the one or more network-preferred access points; and
add an identification of the wireless device to a BTM steering-capable list if the wireless device connects to one of the one or more network-preferred access points.

16. The wireless network of claim 14, wherein to generate the determination, the network controller is further configured to:
add an identification of the wireless device to a BTM steering-capable list if the reassociation request identifies the wireless device as supporting BTM steering.

17. The wireless network of claim 14, wherein to generate the determination, the network controller is further configured to:
track wireless devices to which BTM steering primer messages were sent; and
send the BTM steering primer messages to wireless devices to which BTM steering primer messages were not previously sent.

18. The wireless network of claim 14, wherein the network controller is further configured to utilize BTM steering messages for the wireless device based on the determination that the wireless device supports BTM steering.

* * * * *